(No Model.) 5 Sheets—Sheet 1.
R. YOUNG.
NETTING MACHINE.
No. 463,115. Patented Nov. 10, 1891.
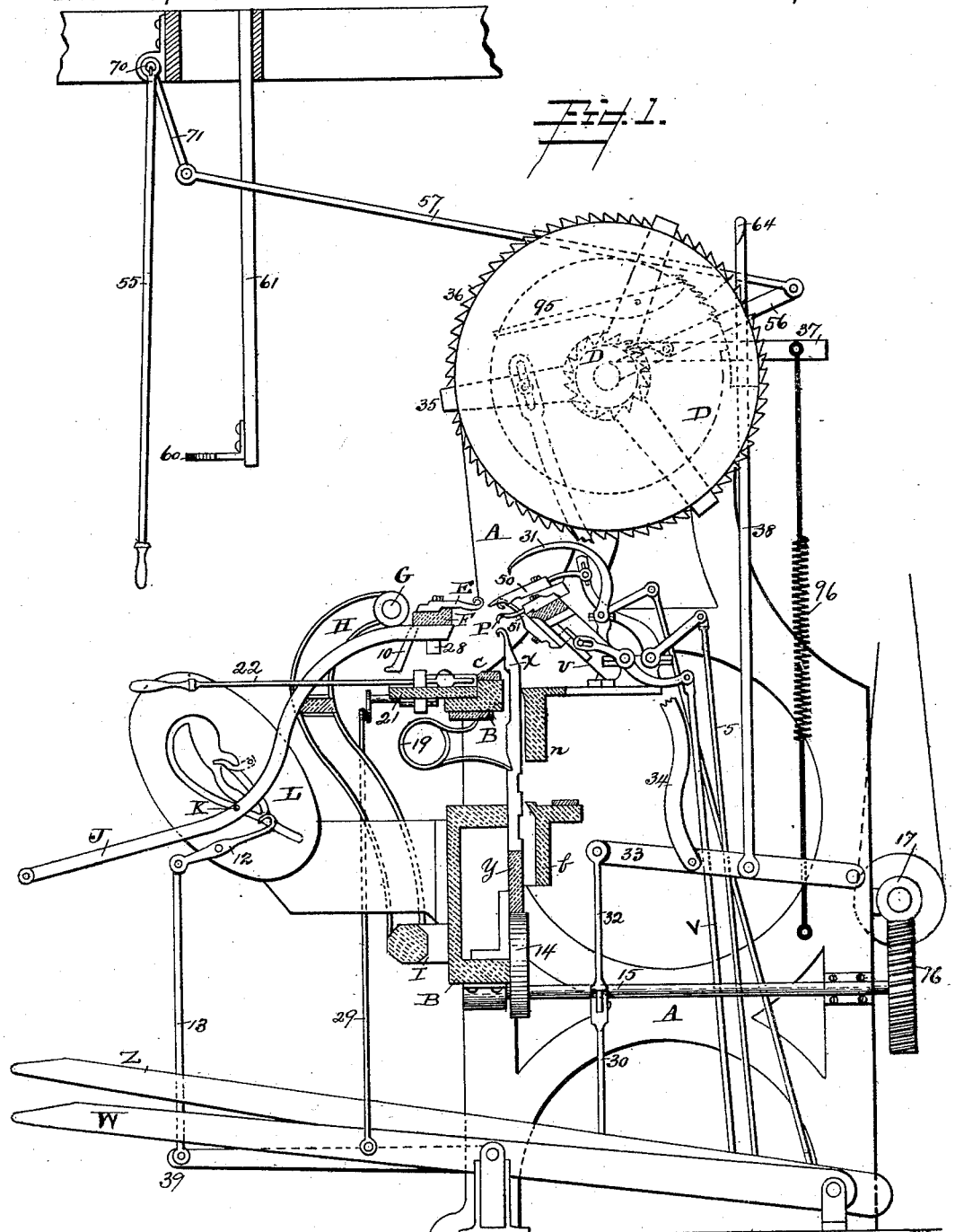
Witnesses
Jas. H. Blackwood
Albert B. Blackwood
Inventor
Robert Young
by W. H. Doolittle
Attorney (No Model.) 5 Sheets—Sheet 2.
R. YOUNG.
NETTING MACHINE.
No. 463,115. Patented Nov. 10, 1891.
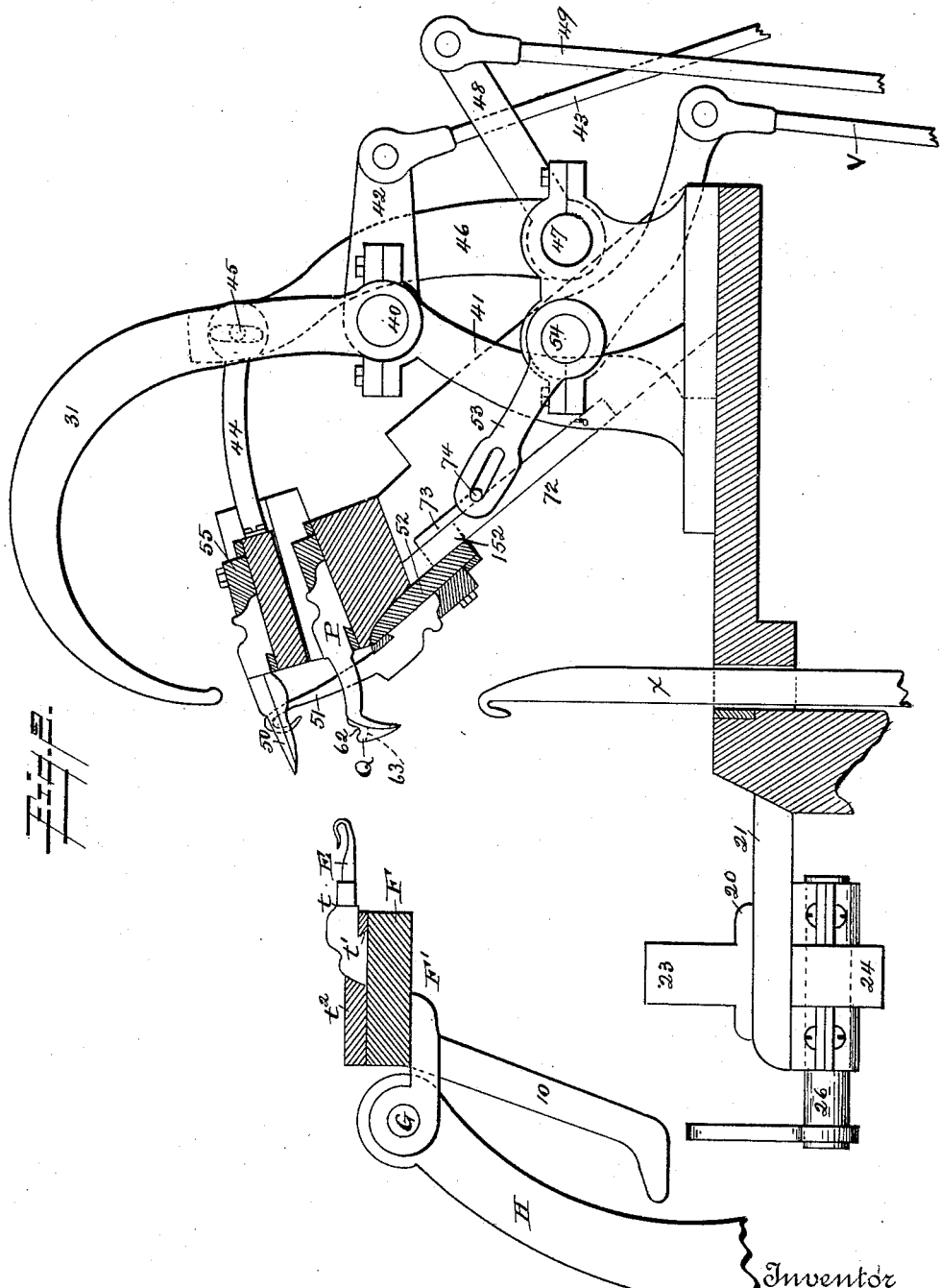
Witnesses
Jos H Blackwood
Albert B. Blackwood
Inventor
Robert Young
by W. H. Doolittle
Attorney (No Model.) 5 Sheets—Sheet 3.
R. YOUNG.
NETTING MACHINE.
No. 463,115. Patented Nov. 10, 1891.
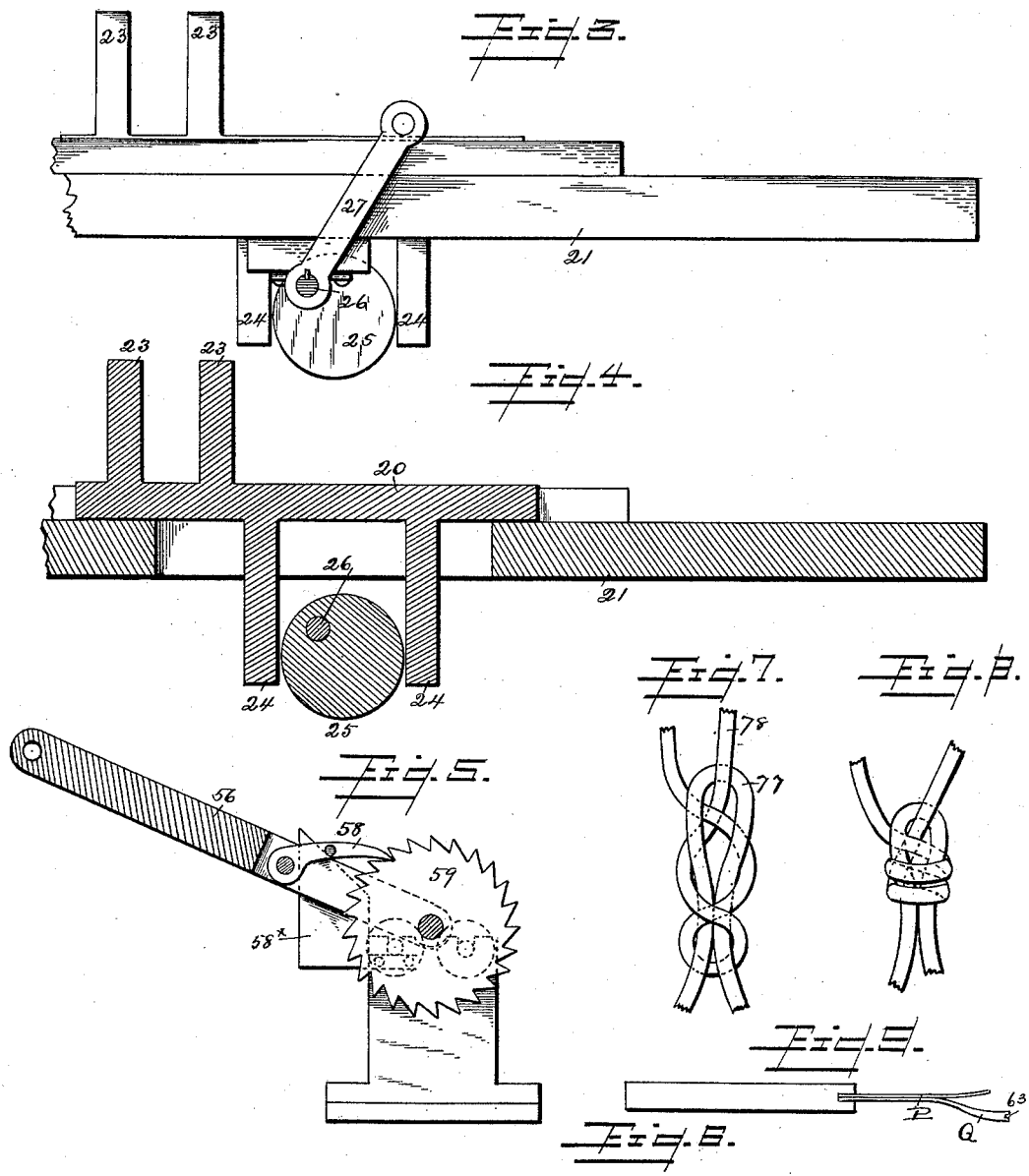
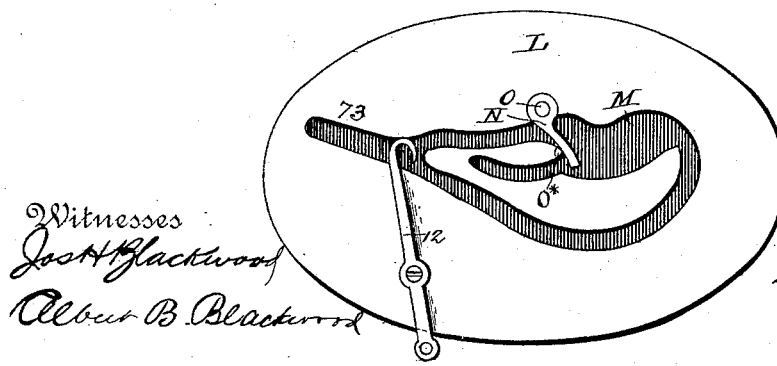
Witnesses
Jos H Blackwood
Albert B. Blackwood
Inventor
Robert Young
by W. H. Doolittle
Attorney (No Model.) 5 Sheets—Sheet 4.
R. YOUNG.
NETTING MACHINE.
No. 463,115. Patented Nov. 10, 1891.
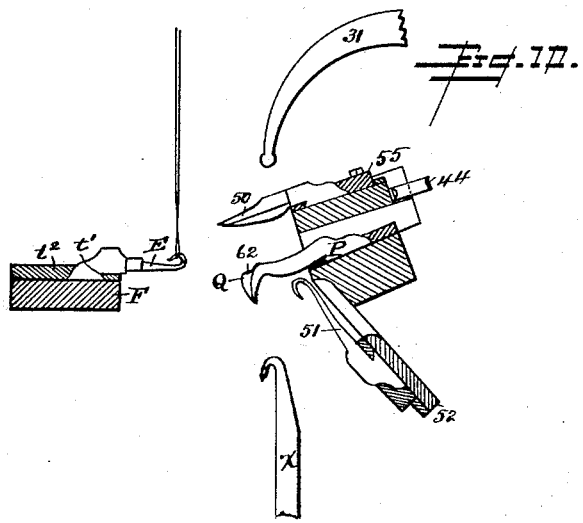
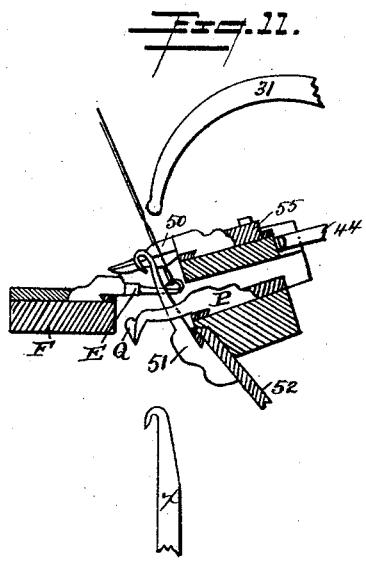
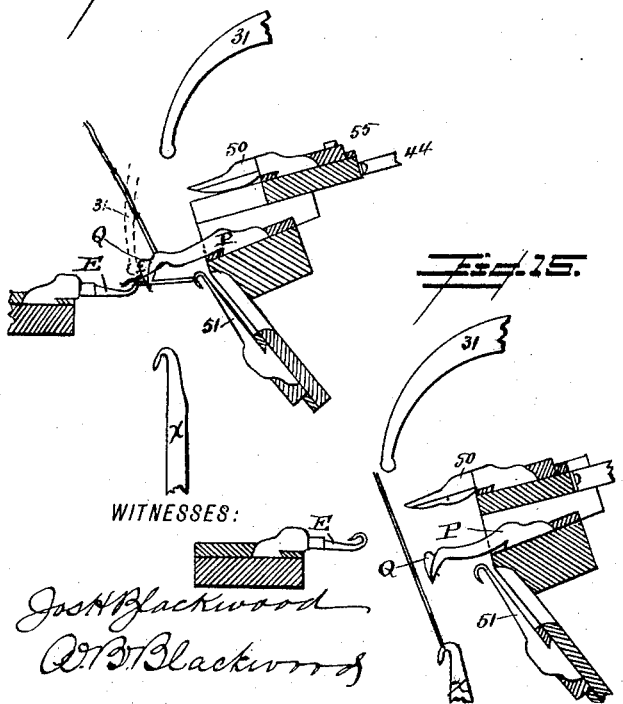
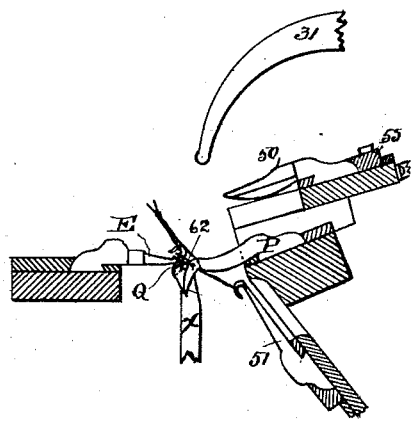
WITNESSES:
Jos H Blackwood
W B Blackwood
INVENTOR
Robert Young
BY
W H Doolittle
ATTORNEY.

(No Model.)　　　　　　　　　　　R. YOUNG.　　　　　　　5 Sheets—Sheet 5.
NETTING MACHINE.
No. 463,115.　　　　　　　　　　Patented Nov. 10, 1891.
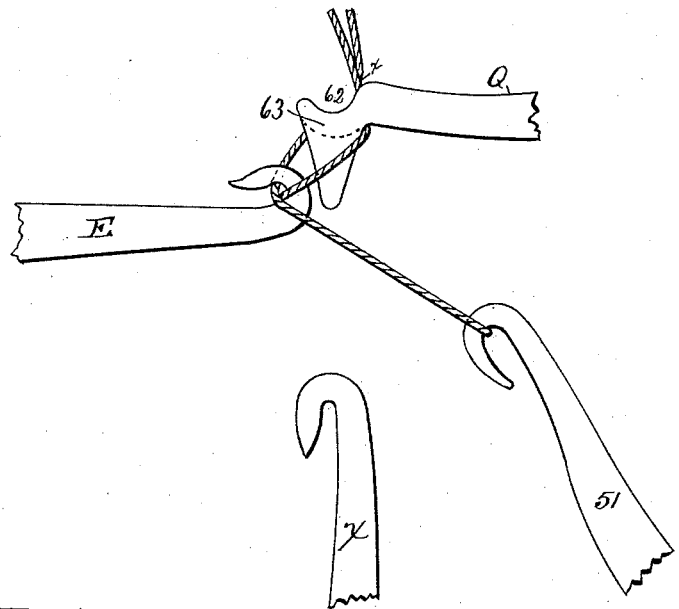
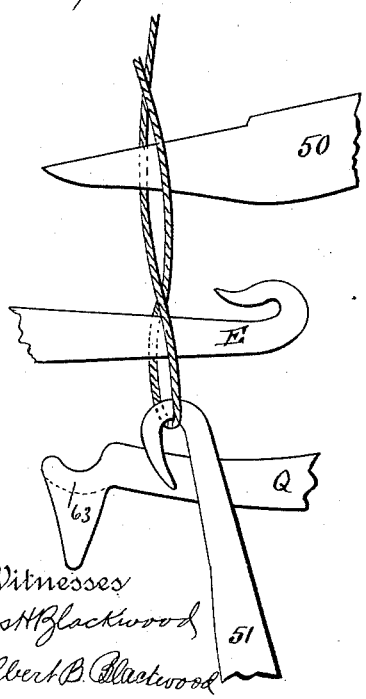
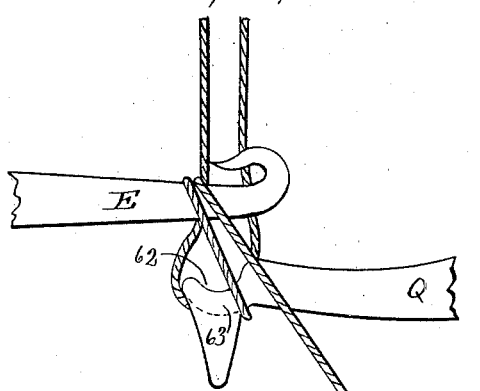
Witnesses
Jos H Blackwood
Albert B Blackwood
Inventor
Robert Young
by Wm H Doolittle
Attorney

UNITED STATES PATENT OFFICE.

ROBERT YOUNG, OF BRISBANE, QUEENSLAND, ASSIGNOR TO JOHN MILNE BARBOUR, OF LISBURN, IRELAND.

NETTING-MACHINE.

SPECIFICATION forming part of Letters Patent No. 463,115, dated November 10, 1891.

Application filed October 31, 1890. Serial No. 369,891. (No model.)

*To all whom it may concern:*

Be it known that I, ROBERT YOUNG, a citizen of Great Britain, residing at Brisbane, Queensland, Australia, have invented certain new and useful Improvements in Netting-Machines; and I do hereby declare the following to be a full, clear, and exact description of the invention, such as will enable others skilled in the art to which it appertains to make and use the same.

My invention relates to machinery for manufacturing nets. Its object is the construction of a machine that will make a net the mesh of which is composed of what I call a "double lock-knot." Previous to my invention nets formed with such a knot have been made, so far as I am aware, by hand alone.

My invention consists of certain important and material changes, as hereinafter described and claimed, in that class of netting-machines for making weavers' knots a type of which is illustrated and described in English Patent No. 1,056 of 1859, to J. Stuart and W. Stuart. In a machine as there illustrated I simply substitute in place of the mechanism for making a form of single knot the mechanism which constitutes my invention. Much, therefore, of the general mechanism and construction beyond what is necessary to illustrate the construction and operation of my improvements is not herein set forth; but reference is made to said patent for such description.

My invention is illustrated in the accompanying drawings, in which—

Figure 1 is an end view in elevation, partly in section, of a machine embodying my improvements; Figs. 2, 3, 4, 5, and 6, details of the mechanism. Figs. 7 and 8 show the form of knot made; Fig. 9, a detail showing the form of one of the needles used; and Figs. 10 to 17, inclusive, are diagrams showing the different positions of the parts forming the knots during the operation.

The framing of the machine, as in the patent referred to, consists of open standards A, which are connected by a transverse frame B, and to which some of the principal actuating portions of the mechanism are attached.

D is the cylinder on which the net as manufactured is wound, and which is provided with a series of pins (not here shown) corresponding in number to the meshes of the net to be made.

E represents a front hook, a series of which extend in a row across the machine, the function of which hooks is to catch the loops at the lower end of the net. The form of this hook is more fully shown in Fig. 2. They are made of brass, fixed into a leaden shank $t$, and provided with dovetailed notches $t'$ to admit of their being readily attached to a bar F, which is correspondingly cut away, and are firmly held in position by a bar $t^2$, bolted to bar F. This bar F is secured to eye-bars F', within eyes of which extend the ends of a horizontal shaft G, which is journaled in a rocking frame H. The rocking frame H is connected at its opposite ends to supports I secured to the frame B. The hook-bar F is moved to and fro in the required direction by means of the hand-lever J. This direction is given by a guide-plate L. For this purpose the hand-lever J is provided with a laterally-projecting pin or stud K, which enters and travels in a slot M. This guide-plate and the course taken by the guide-pin is more fully indicated in Fig. 6. The plate is an elliptically-shaped plate of iron, which is supported at right angles to the front of the machine by being bolted to an outwardly-projecting bracket, that is secured to the front part of the frame B, as shown in Fig. 1.

The peculiar form of the curved groove or recess M is shown in Fig. 6, and it is the traverse of the pin K in this circuitous path that causes the hooks E to place the loops of the net in the proper position for forming the knots. The extension 73 of the groove is important, as it permits the front hook to be carried into pusher-needle 50, as hereinafter described. To the face of the plate L is fixed a stud O, on which is hung a pawl N, which is provided from falling too far back by a stop O*, fixed behind it. The position of the guide-pin may be fixed in the plate L by means of a link-hook 12, which engages with the pin K. Said link-hook is jointed to rod 13, which is connected to the treadle 39. It will be seen that the hook may be engaged with the pin K in the grooved guide-plate, and thus lock the lever J at a given point, and the object is to prevent the hooks E from falling against the stationary needles P on the opposite side.

When it is desired that the front hook E should enter the groove of the pusher, as hereinafter described, the pin K is allowed to run down to the end of the slot.

The arrangement of the needles, hooks, and fallers is shown in Fig. 2. In the process of making a net the hook-bar F carrying the front hooks E has to be moved alternately to the right or left, so as to cause the hooks to enter the fallers one faller to the right or left according to the position it was in at the formation of the previous half-mesh.

To give the net-hooks E a sidewise to-and-fro movement for the purpose of permitting the back hooks 51 to come up and engage with the mesh, as hereinafter described, I employ a frame 20, adapted to slide on a bed 21. This frame is provided with upwardly-extending arms 23 and downwardly-extending arms 24. Between the lower arms 24 is placed an eccentric disk or roller 25, mounted on a shaft 26, that is journaled in bearings on bed 21. To such shaft is keyed or linked bar 27, connected to vertical rod 29, which in turn is connected to treadle W. 10 is a foot-bar guide connected to the bar F to enter between and be operated alternately by the upper arms 23 on slide 20. When the eccentric is operated to force the bar F one way an upright 23 operates to force the bar 10 in the same direction, and in the opposite direction when the eccentric is reversed.

The fallers are represented by the letter X and are thin steel bars, the upper ends of which terminate in hooks. The lower ends of the fallers rest upon a transverse bar Y when they are in their lowest position.

14 is a disk on which the bar Y rests to give the transverse bar Y upward movement, its own weight keeping the bar in contact with the disk, and is mounted eccentrically on a shaft 15, which is journaled in bearings secured to the frame. The outer end of shaft 15 carries a pinion 16, engaging with a worm-shaft 17 driven by a clutch-pulley 18, a clutch-pulley being used in order that shaft 17 and disk 14 may be actuated only at the time when the operator wishes to raise the fallers. The faller is kept in contact with the transverse bar Y resting on the cam by means of a double coiled spring 19, one end of which is secured to the frame B, while the other end rests in a notch in the faller, and which spring forces the faller down after it has been raised by the action of the cam. As in said English Patent No. 1,056, the fallers are raised by the bar Y to the level of a bar b, and are pressed back so as to rest thereon by means of a duplex buffer (not here shown) arranged at the front part of the machine. When the fallers have performed their part in the formation of the knots they are required to be moved quickly out of the way. This is done by causing them to descend in rapid succession onto the faller-bar Y. The pushing off of the fallers from the bar b is effected almost simultaneously by means of a "slur" or traversing apparatus, which moves with great rapidity from side to side of the machine, which slur (not here shown) is the same as set forth in said patent. As the slur traverses along behind the fallers, an outwardly-projecting finger with which it is provided comes in contact with them and so pushes them off the bar b.

31 is a swinging bar, which is also known as a "relieving" or "chapping" bar, the function of which is to force the meshes off the front hooks, and also to push a leg of each of the same into the slots 63 of the stationary needles P Q. It is mounted on shaft 40, which has its bearings in brackets 41. Said shaft has connected thereto an arm 42, connected to rod 43, which in turn is secured to one of the bottom treadles. 44 is an arm joined at one end by a pin-and-slot connection 45 to an upright arm 46, keyed on a shaft 47, and connected at its opposite end to the pusher-bar 55. Secured to the same shaft 47 is an arm 48, joined to rod 49, which is also secured to a bottom treadle.

Q is a brass needle, the extremity of which is downwardly directed and extends outward in an angular direction, as shown in Fig. 2, the front or nose part of the needle forming a vertical or nearly vertical line. The outer part of the needle is bent in a lateral direction toward the right, as shown in Fig. 9. Arranged parallel with the needle Q is a spring part P, the outer extremity of which is downwardly directed and formed of a triangular figure, the point of the spring being in contact with the adjacent needle Q to its left in Fig. 9. The metal at the upper part of the needle is bent over to the side to form a groove 63 underneath and curved downward to form a concavity 62. This part of the needle forms a horizontal groove for the passage of the shuttle when a series are arranged together. This needle, the faller, and the front net-hook E are the same in form as in said English Patent No. 1,056 of 1859, and need not be further described. The back hooks 51 are mounted on a sliding frame or bar 52, connected to a rocker-arm 53, which is mounted on a shaft 54. The frame 52 is provided with a lug or projection 152, (shown in dotted lines in Figs. 1 and 2,) which slides in a slot formed by two strips 72 on the framework. On the back of this frame is a downwardly-extending piece 73, provided at its lower end with a pin 74, with which the slot in the rocker-arm 53 engages. The function of the hook 51 is to pull down the thread from front hook E and to give a second twist to the mesh, the first twist of the thread being given by the hook E as the latter draws it off from the faller. The pusher 50 is mounted on a frame 55 and actuated as before described. The function of pusher 50 is to enter the mesh and keep it open until the front hook E catches the thread.

The beam D is or may be turned forward to take up the net as formed by a hook 64 engaging teeth 36, said hook being formed at the top of rod 38, the same being pulled down when required by depressing lever 33, said lever 33 having connected to it a rod 34, in turn connected by a pin and slot to the usual frame 35, the said frame having the pawl 95 and the arm 37, the arm 37 being pulled down by a spring 96. Depression of hook 64 turns the beam forward, the frame 35, &c., being caused to follow by spring 96. When hook 64 is raised the spring 96, pawl 95, &c., prevent beam D from turning backward. The rod 34 being connected to lever 33 and frame 35 causes pawl 95 to engage new teeth on the inner ratchet each time lever 33 is depressed. When, however, the beam D is turned backward or slackened by mechanism hereinafter described, the spring 96 yields, allowing the frame 35, pawl 95, &c., to turn back with the beam.

The web-beam D is turned backward by a handle 55 and a crank 56 and rod 57. The crank 56 is provided with a pawl 58, which engages a rachet 59, keyed on the same shaft that carries beam D. As shown in Fig. 5, a cam-plate 58* is employed, on which rides a pin attached to the pawl 58 for lifting the pawl out of engagement with ratchet 59 when the beam is released.

60 is a catch secured on a bracket 61 to hold the handle 55 when crank 56 and pawl 58 are not in use. The handle 55 is secured to a short shaft 70, which is journaled in a beam in the ceiling, and the short arm 71, extending to rod 57, is secured to the same shaft. When the handle 55 is held by the catch 60, the arms 71 and 57 and crank-lever are held so that the pawl 58 is disengaged from ratchet-wheel 59 by cam 58*.

The beam D is or may be prevented from turning backward or toward the front of the machine and before the pawl 58 acts by a pawl 95, (indicated by dotted lines in Fig. 1, and as shown in said English patent,) which is carried on a stud on the inner face of the independently-moving frame 35 and engages with inner annular ratchet-teeth of beam D. As the meshes are formed, the net is wound upon the beam D. The pawl just described carried on the frame 35 does not interfere with the motion of the drum when winding on or moving in a forward direction. The purpose of releasing the beam D is to slacken the net at a given point for the purpose of permitting the hooks and needles to operate on the slackened thread to form the knot. The knot formed is shown in Figs. 7 and 8. Fig. 7 shows the form of the knot before it is drawn tight, and Fig. 8 the knot when tightened.

The operation of the machine may briefly be described as follows: Assuming the row of meshes last formed to be still engaged by the fallers, the front hooks are moved forward, enter the meshes, recede, and descend a little, which takes the meshes off the fallers, and in consequence of the left-handed inclination of the points of their hooks leaves the meshes on the hooks with the cross shown in Fig. 10. The front hooks then go forward to the position of Fig. 11, the pushers entering the meshes just below the cross. Hooks E then move a little to the left to get out of the way of the back hooks 51 and permit the latter to rise to the position of Fig. 11. Hooks E then recede somewhat, causing the right-hand leg of the mesh to engage the point of hook 51, which is also inclined to the left. The beam D having been slackened, hooks 51 descend below the level of the front hooks, when the latter are moved to the right to bring them again over the spaces between the needles Q. They are then pushed still farther in, when the position of the parts is about that of Fig. 16, after which the said front hooks are moved up and out and engage in their hooks the crossings just below the pushers, said crossings having been formed by the movement of the back hooks. The pushers are then withdrawn. Both sets of hooks then descend through the needles and the front hooks are brought to the position of Figs. 12 and 13, there being one crossing in the front hooks and another, Fig. 12, between the needles. Bar 31 is then brought down, as indicated by dotted lines in Fig. 13, which causes the right-hand leg of the mesh, which is also the rear leg, and which is adjacent to the needle, to be left in the groove 63 of the needle when the relieving or chapping bar is thrown back. Hooks E are then carried over and a little beyond the shuttle-path 62, as indicated in Fig. 17. The fallers then rise to the position of Fig. 14, when the shuttle is actuated to pass the yarn through the opening in the parts formed as described. The fallers then descend with the bights of the yarn for the new meshes. Hooks E then return to the position of Fig. 13, when, by slackening the beam D (if necessary) and bringing down the relieving-bar, the parts are disengaged from both sets of hooks, leaving a loose knot like that of Fig. 7 on the end of each needle, the part 77, which is the shuttle-thread, lying across the groove 62 and the part 78 being in the groove 63. As soon as pawl 58 of the devices for slackening the beam is disengaged from ratchet 59, the spring 96 of the usual take-up mechanism tightens the knot, which is drawn still tighter in the usual operation of taking up the netting, which also takes the knots off the needles, and after which the position of the parts will be that of Fig. 15. The operation is then repeated as before, except that the front hook-bar is alternately shogged to the right and to the left by the usual mechanism, so as to leave the vacant selvage-faller alternately at opposite sides of the machine. In beginning a net the meshes may be crossed, as in Fig. 10, and placed upon the front hooks E by hand instead of first upon the fallers.

Having thus described my invention, what I claim is—

1. In a netting-machine, a pusher for the purpose of holding the mesh in position while a second twist in the thread is being formed, in combination with a pusher-bar, to which the needle is secured, and a rocking lever and shaft for operating the same, substantially as described.

2. In a netting-machine, a vertically-sliding back hook for carrying down the loop, in combination with a sliding frame, to which said hook is secured, and a rocking slotted lever and shaft for operating the same, substantially as described.

3. In a netting-machine, the front hook for carrying the net-loop, in combination with the eccentric mechanism consisting of a sliding frame having downwardly-extending arms, an eccentric placed between said arms, said frame also having upwardly-extending arms, a foot-bar secured to the hook-bar and adapted to move between said upper arms, and mechanism for operating said eccentric, whereby the front hook is given its lateral to and fro movement, substantially as described.

4. In a netting-machine, the faller-bar and fallers, in combination with a cam-disk, on which said bar rests, the shaft for carrying the disk, and mechanism for operating said shaft, and a spring bearing down on the faller, whereby the faller is given an alternate up and down movement, substantially as described.

5. In a netting-machine, the elliptical cam-plate provided with a slot or groove, such as M, said groove having an extension 73, in combination with the lever-arm, the pusher, and front hook-bar, said lever-arm provided with a pin to travel in said groove, whereby the front hook is carried forward and upward toward and into the pusher, substantially as described.

6. In a netting-machine, the cam-plate provided with the slot or groove M, in combination with the front hook-bar, the lever-arm provided with a pin to travel in said groove, a link-hook stop adapted to engage with said pin, and a connecting rod and lever for operating said stop, whereby the front hook is held in a given position, substantially as described.

7. In a netting-machine, the combination, with the fallers, of the front hook-bar of the rocking frame, hand-lever, and guide-plate, sliding frame, supporting-frame, shaft 26, carrying eccentric 25, link 27, rod 29, and treadle-lever for giving the front hook a forward, backward, and sidewise movement, the pusher, the vertical sliding back hook, the stationary needle P Q, the relieving-bar, and mechanism for operating said bar, substantially as described.

In testimony whereof I affix my signature in presence of two witnesses.

ROBERT YOUNG.

Witnesses:
JOS. H. BLACKWOOD,
H. E. JOHNSON.